Patented Jan. 18, 1944

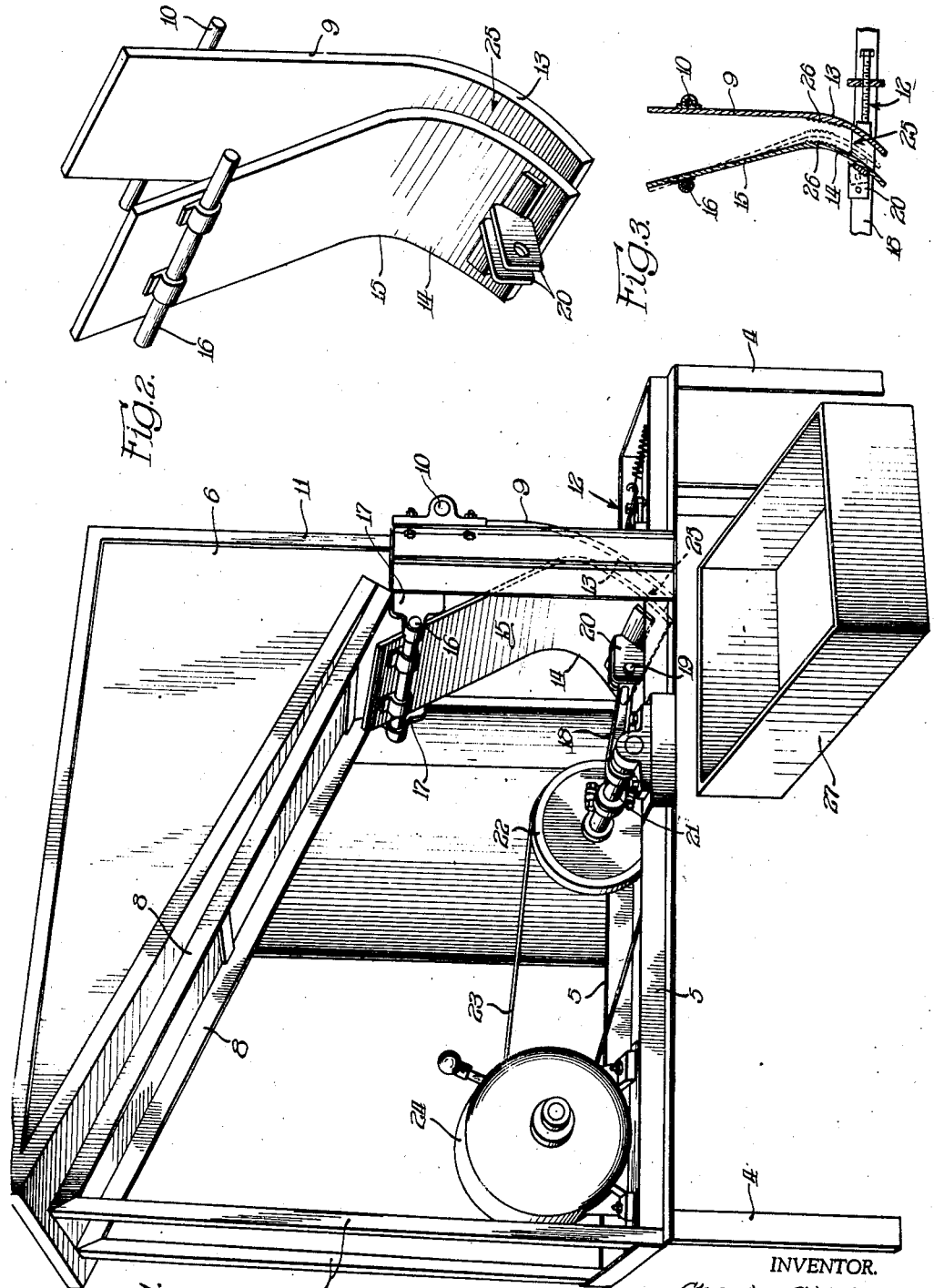

2,339,596

UNITED STATES PATENT OFFICE 2,339,596

NUT-CRACKING MACHINE

Charles C. Wright, McMinnville, Oreg.

Application May 21, 1941, Serial No. 394,407

1 Claim. (Cl. 146—12)

This invention relates to nut cracking machines, and its primary object is to provide a new and improved nut cracker having novel means for effecting the thorough cracking of nuts without, in any way, damaging the nut meats.

Another object of the invention is the provision of a new and novel nut cracking machine having opposed, curved operating or nut cracking surfaces whereby the nuts, during the cracking operation, are located in a particular position or zone so as to prevent the nuts from raising upwardly and thus definitely cause each nut fed to the zone to be positively cracked.

Another object of the invention is to provide a nut cracking element in the form of a movable curved surface cooperating with an adjacent rigid curved surface whereby the nuts are prevented from shifting their position during the nut cracking operation.

Still another object of the invention is the provision of a nut cracking element comprising opposed, curved surfaces, one of which is movable toward and away from the other, the cooperating curved surfaces acting to definitely and positively crack the nuts by preventing the nuts, during the cracking operation, from shifting.

Numerous other objects and advantages will be apparent throughout the progress of the following specification:

The accompanying drawing illustrates a selected embodiment of the invention and the views therein are as follows:

Fig. 1 is a detail perspective view of a nut cracking machine, and embodying the invention, Fig. 2 is a detail perspective view of the opposed nut cracking surfaces, and Fig. 3 is a detail sectional view through the said nut cracking surfaces.

It is common in the art of cracking of nuts that there be two opposed surfaces, one of which may be rigid and the other of which may be movable, to crack nuts therebetween. These opposed surfaces are somewhat in the nature of a guiding chute or trough, and as the nuts are fed to position, by gravity or otherwise, the squeezing action of one plate or surface against the other causes the nuts to rise upwardly, ofttimes causing the chute or trough to become jammed, often resulting in improper cracking. Numerous attempts have been made to prevent the nuts from moving out of cracking position when one plate is shifted with respect to the other, and one such arrangement has been to provide ribs on the inner surface of either or both of the cracking members. This latter construction resulted in the space between the operating surfaces being closer together, causing frictional engagement of the ribs with the nuts often resulting in damage to the nut meats. If the space between the plates were not relatively close, the nuts would shift out of position during the cracking operation. The present invention overcomes the inherent difficulties which have arisen in prior nut cracking machines by curving the nut cracking surfaces in the manner shown in the drawing.

The particular nut cracking machine herein shown for the purpose of illustrating the invention comprises a supporting base or stand 4 upon which there is mounted a horizontal support in the form of members or angles 5. A nut receiving hopper 6 is secured rigidly to the support 4 by means of the vertical supporting members 7 and inclined supporting members 8.

The operating or nut cracking members comprises a curved backing plate 9 which is pivotally mounted at 10 to a hopper support 11. This plate 9 is adapted to be shifted inwardly and outwardly by means of an adjusting screw element 12. The plate is thereby maintained in rigid position, but is adapted to be shifted inwardly and outwardly, depending upon the size of nuts to be cracked. The lower end of the member 9 is curved as indicated at 13, Fig. 2, and is adapted to cooperate with a curved surface 14 on a movable nut cracking plate 15. The plates 9 and 15 are both shown relatively thin, being made from sheet steel material. However, both plates need not be made of thin material to obtain the advantages, it being desirable, though, that at least one of the plates be relatively thin. The plate 15 is pivotally mounted at 16 to rigidly mounted supporting brackets 17. The plate 15 is adapted to be shifted toward and away from the plate 9 by a crank arm 18 pivotally connected at 19 to opposed brackets or lugs 20 on the outside of the plate 15. The crank arm 18 is operated by a crank 21 driven by a fly wheel 22. The fly wheel 22 is rotated by any suitable means such as a belt 23 driven by an electric motor 24. The curved surface 13 of the member 9 and the curved surface 14 of the member 15 comprise the operating nut cracking members or elements of the machine.

In actual practice it has been found that as the nuts move downwardly into the opening 25 defined by the space between the members 9 and 15, they are prevented from shifting upwardly out of cracking position during the cracking operation when the plate 15 moves toward the plate 9. The operating or nut cracking surfaces 13 and 14 of the plates 9 and 15 respectively prevent the nuts from sliding or shifting upwardly during the operating movement of the plate 15 toward the rigid plate 9. The arcuate or curved lower portions of the members 9 and 15, being positioned relatively opposite and tending to direct the nuts from a relatively vertical position toward a somewhat horizontal position, cause positive cracking of the nuts when they arrive at a pre-determined position between the plates 9 and 15 and overcome the shifting movement of the nuts. It has been found, too, that the curvature at the lower ends of the members 9 and 15, which in effect form a receiving trough for the nuts, causes definite cracking of the shells but overcomes all injury to the nut meats.

If desired, the inner surfaces of the plates 9 and 15, at the curved nut cracking surfaces 13 and 14, respectively, may be provided with serrations or ribs 26 to assist further in preventing movement of the nuts as the plate 15 moves to cracking position. However, it has been found that the omission of these serrations or ribs 26 lends for better performance as there is always the possibility that ribs or corrugations may cause the shells to be pressed inwardly and cause damage to the nut meats. If such ribs or serrations are provided, they should be relatively shallow so as to overcome any danger of the nut meats becoming mutilated. While such ribs or serrations may be desirable in some instances, depending upon the smoothness and hardness of the nuts to be cracked, it has been found that the device operates very successfully without their use. During some months of actual useage, several tons of English walnuts have been cracked on a machine embodying the principles of the invention herein shown. In all instances, the shells have become sufficiently cracked to permit ready and easy removal of the shells without in any way damaging the nut meats.

In operation, nuts are placed in the hopper 6 where they will fall by gravity downwardly in between the plates 9 and 15, which in effect, act as a trough to receive the nuts. Side plates being in substantial engagement with the side edges of the plates 9 and 15 may be provided to prevent the nuts from falling out sideways between the plates. As the plate 15 is moved toward the plate 9 by the crank arm 18 during its movement to the left, Fig. 1, the nuts will be cracked. Nuts which have been previously cracked will follow into the lower receiving hopper 27, and a new batch of nuts to be cracked will move into position in between the plates 9 and 15 to be cracked during the next cracking operation.

The invention provides a strong and durable, though relatively simple, device for cracking surely and positively the shells of nuts, but preventing damage or injury to the nut meats. The device is exceedingly inexpensive and can be applied instantly and readily to existing machines as well as to new machines. The pivotal mounting of the rigid plate allows for the proper adjustment so that nuts of various sizes, having been graded to size beforehand, may be accommodated. The pivotal mounting of the operating or cracking plate 15 causes the nuts to be engaged sufficiently to cause the shells to be cracked properly. The curvature of the lower extremities of the members 9 and 15 overcomes shifting of the nuts during the cracking operation and causes the shells to be cracked properly without in any way damaging or injuring the nut meats.

Changes may be made in the form, construction, and arrangement of the parts without departing from the spirit of the invention or sacrificing any of its advantages, and the right is hereby reserved to make all such changes as fairly fall within the scope of the following claim.

This invention is hereby claimed as follows:

A nut cracking machine for cracking the shells of nuts without damaging the nut meats and comprising a pair of opposed spaced nut shell cracking plates, at least one of said plates being relatively thin, said plates being arranged in generally vertical positions, each of said nut shell plates being pivotally mounted on fixed pivots adjacent the upper end and having a depending curved portion adjacent the lower end, said curved portions of each plate being of complementary arcuate curvature approaching the horizontal from the vertical, said plates being always spaced apart and providing an arcuate nut cracking recess between the said arcuate surfaces to prevent the nuts from jumping upwards and providing a nut cracking zone, the spacing between the plates being such as to prevent uncracked nuts from falling through but permitting cracked nuts to be passed between the plates without damaging the nut meats, one of said nut shell cracking plates being movable about its pivot to have the lower end adjacent said curved portion secured in selected positions of fixed adjustment, means for securing said plate in selected positions of adjustment, said other nut shell cracking plate being oscillable at its lower end through a predetermined range of short, fast, reciprocal movements and in a direction arcuately toward and away from the complementary curved portion of said one plate so that the opposed curved faces of the two plates cooperate in cracking the nut shells without crushing the nut meats, and means for oscillating said other plate.

CHARLES C. WRIGHT.